United States Patent
Töltsch et al.

(10) Patent No.: US 10,287,375 B2
(45) Date of Patent: May 14, 2019

(54) PROCESS FOR THE PREPARATION OF A PROPYLENE POLYMER

(71) Applicant: BOREALIS AG, Vienna (AT)

(72) Inventors: Wilfried Töltsch, Marchtrenk (AT); Luigi Resconi, Ferrara (IT); Kristin Reichelt, Neuhofen/Krems (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 14/897,150

(22) PCT Filed: Jun. 9, 2014

(86) PCT No.: PCT/EP2014/061930
§ 371 (c)(1),
(2) Date: Dec. 9, 2015

(87) PCT Pub. No.: WO2014/198677
PCT Pub. Date: Dec. 18, 2014

(65) Prior Publication Data
US 2016/0115266 A1    Apr. 28, 2016

(30) Foreign Application Priority Data
Jun. 10, 2013  (EP) .................................... 13171308

(51) Int. Cl.
| | |
|---|---|
| *C08F 2/01* | (2006.01) |
| *C08F 4/6592* | (2006.01) |
| *C08F 210/06* | (2006.01) |
| *C08F 210/16* | (2006.01) |
| *C08F 2/00* | (2006.01) |
| *C08F 4/659* | (2006.01) |
| *C08F 4/70* | (2006.01) |
| *C08L 23/12* | (2006.01) |

(52) U.S. Cl.
CPC ............ *C08F 210/16* (2013.01); *C08F 2/001* (2013.01); *C08F 4/65912* (2013.01); *C08F 4/70* (2013.01); *C08F 210/06* (2013.01); *C08L 23/12* (2013.01); *C08F 2410/01* (2013.01)

(58) Field of Classification Search
CPC .................. C08F 2/001; C08F 4/65927; C08F 4/659012; C08F 210/06
See application file for complete search history.

(56) References Cited

U.S. PATENT DOCUMENTS

| | | |
|---|---|---|
| 4,740,550 A | 4/1988 | Foster |
| 2008/0275200 A1 | 11/2008 | Denifl et al. |
| 2009/0270566 A1 | 10/2009 | Thorman et al. |
| 2015/0322250 A1 | 11/2015 | Katsuno et al. |
| 2016/0185945 A1 | 6/2016 | Katsuno et al. |

FOREIGN PATENT DOCUMENTS

| | | |
|---|---|---|
| WO | 94/14856 A1 | 7/1994 |
| WO | 98/58975 A1 | 12/1998 |
| WO | 98/58976 A1 | 12/1998 |
| WO | 98/58977 A1 | 12/1998 |
| WO | 02/074817 A2 | 9/2002 |
| WO | 03/051934 A2 | 6/2003 |
| WO | 2005/023889 A1 | 3/2005 |
| WO | 2006/069733 A1 | 7/2006 |
| WO | 2006/097497 A1 | 9/2006 |
| WO | 2006/097500 A1 | 9/2006 |
| WO | 2010/052260 A1 | 5/2010 |
| WO | 2010/052263 A1 | 5/2010 |
| WO | 2010/052264 A1 | 5/2010 |
| WO | 2011/080152 A1 | 7/2011 |
| WO | 2013/007650 A1 | 1/2013 |
| WO | 2013/007664 A1 | 1/2013 |
| WO | 2013/125670 A1 | 8/2013 |

OTHER PUBLICATIONS

International Search Report dated Aug. 4, 2014, issued in counterpart application No. PCT/EP2014/061930 (3 pages).
Written Opinion dated Aug. 4, 2014, issued in counterpart application No. PCT/EP2014/061930 (7 pages).
Carvill et al., "Polymer Microstructure as a Probe into Hydrogen Activation Effect in ansa-Zirconocene/Methylaluminoxane Catalyzed Propene Polymerizations", Macromolecules, vol. 30, pp. 7056-7062, 1997 (in English).
Jungling et al., "Propene Polymerization Using Homogeneous MAO-Activated Metallocene Catalysts: Me2Si(Benz[e]Indenyl)2ZrCl2/MAO vs. Me2Si(2-Me-Benz[e]Indenyl)2ZrCl2/MAO", Journal of Polymer Science: Part A: Polymer Chemistry, vol. 33, pp. 1305-1317, 1995 (in English).

*Primary Examiner* — Caixia Lu
(74) *Attorney, Agent, or Firm* — Westerman, Hattori, Daniels & Adrian, LLP

(57) ABSTRACT

A process for the preparation of a propylene polymer in a multistage polymerisation process in the presence of a single site catalyst, said process comprising: (I) in a prepolymerisation step prepolymerising a single site catalyst in the presence of propylene and optionally at least one C2-10 alpha olefin comonomer and in the presence of hydrogen or in the absence of hydrogen; (II) in a slurry polymerisation step, polymerising propylene and optionally at least one C2-10 alpha olefin comonomer, with the pre-polymerised catalyst of step (I) in the presence of hydrogen; and subsequently (III) in a gas polymerisation step polymerising propylene and optionally at least one C2-10 alpha olefin comonomer, in the presence of catalyst and polymer from step (II) and optionally in the presence of hydrogen so as to form a propylene homopolymer or copolymer; wherein the amount of hydrogen fed to the pre-polymerisation step (I) is at most 15% of the total amount of hydrogen fed to steps (I) and (II) of the polymerisation process.

9 Claims, 1 Drawing Sheet

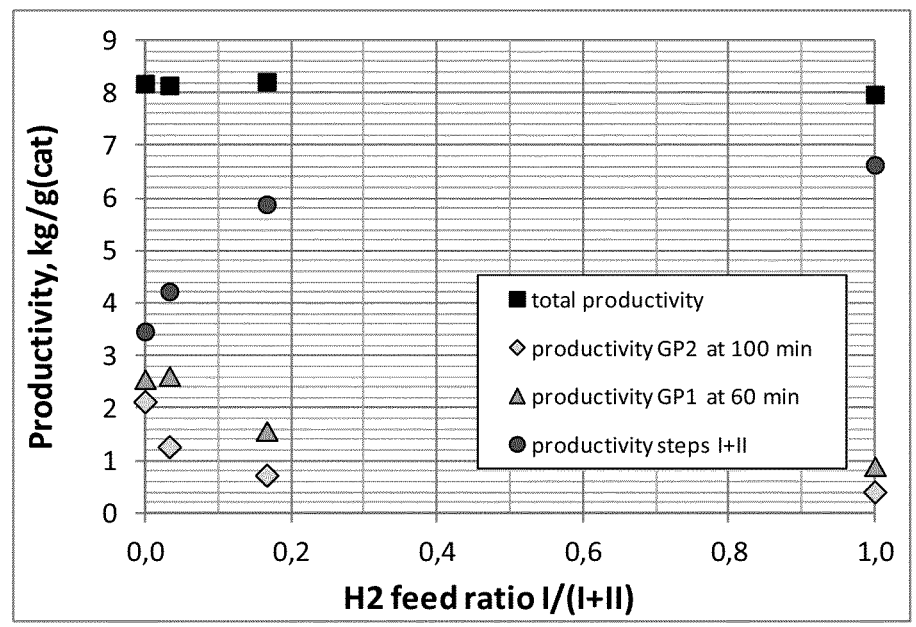

PROCESS FOR THE PREPARATION OF A PROPYLENE POLYMER

The present invention relates to a process for producing a multimodal polypropylene copolymer using a single site catalyst in a multistage polymerisation process. In particular, the invention relates to a process where catalyst productivity in each step can be controlled and adjusted to a desired level making it possible to control the final polymer properties. This is achieved through the manipulation of hydrogen concentration in the prepolymerization reactor and in the first main polymerisation reactor of the process, in particular through minimisation of the hydrogen concentration in the prepolymerisation step.

BACKGROUND

Multistage polymerisation processes are well known and widely used in the art for polymerising polypropylene. Process configurations containing at least one slurry phase polymerisation reactor and at least one gas phase polymerisation reactor are disclosed e.g. in U.S. Pat. No. 4,740,550, and further e.g. in WO98/058975 and WO98/058976. A prepolymerisation reactor is often included in the process configuration, typically to maximise catalyst performance. The use of prepolymerisation also avoids overheating the catalyst particles. Prepolymerisation also helps to ensure a more even polymerisation on the catalyst particles reducing the probability of creating fines in later reaction steps.

Single site catalysts have been used to manufacture polyolefins for many years. Countless academic and patent publications describe the use of these catalysts in olefin polymerisation. One big group of single site catalysts are metallocenes, which are nowadays used industrially and polyethylenes and polypropylenes in particular are often produced using cyclopentadienyl based catalyst systems with different substitution patterns.

Single site catalysts are used in propylene polymerisation in order to achieve some desired polymer properties. However, there are problems in using single site catalysts on industrial scale in multistage polymerisation configurations.

Metallocenes are conventionally supported on a carrier such as silica. Research has found that heterogeneous catalysis (in which the catalyst particles do not dissolve in the reaction medium) gives rise to more advantageous polymer products than homogeneous catalysis (in solution). The use therefore of a support is common place. The use however of supported catalysts is associated with problems such as silica residues in the final product. Further, there is still room for improved activity, and improved polymer particle formation.

In WO03/051934, the inventors proposed an alternative form of catalyst which is provided in solid form but does not require a conventional external carrier material such as silica. The invention is based on the finding that a homogeneous catalyst system containing an organometallic compound of a transition metal can be converted, in a controlled way, to solid, uniform catalyst particles by first forming a liquid/liquid emulsion system, which comprises as the dispersed phase, said solution of the homogeneous catalyst system, and as the continuous phase a solvent immiscible therewith, and then solidifying said dispersed droplets to form solid particles comprising the said catalyst.

The invention described in WO03/051934 enabled the formation of solid spherical catalyst particles of said organo-transition metal catalyst without using e.g. external porous carrier particles, such as silica, normally required in the art.

Thus, problems relating to catalyst silica residues can be solved by this type of catalyst. Further, it could be seen that catalyst particles having improved morphology, will give, due to the replica effect, polymer particles having improved morphology as well.

Some multistage polymerisations utilise a slurry then gas phase set up. One of the possible limitations of polymerization catalysts in general, and of metallocene-based catalysts in particular, is that when the catalyst has a high activity in slurry, e.g. bulk, the activity in gas phase is often low. This makes it difficult to achieve a low bulk-to-gas phase ratio of the produced material (the so-called bulk/GP split). In other words, strong (initial) activity in the bulk step can lead to faster catalyst deactivation, in turn leading to a poorly active catalyst in the gas phase reactor. This problem is especially relevant for gas phase copolymerizations in a three-step sequence, slurry phase, gas phase, gas phase where the copolymer is produced in the third step.

To be relevant for industrial polypropylene production, a single site catalyst must have good performance under all polymerisation conditions, in particular in conditions, where polymerisation temperature is at least 70° C., and in all actual polymerisation reactors of the multistage process including both liquid (bulk slurry) and gas phase reactors. The present invention tries to address this issue.

The present inventors have now found that when all or most of the hydrogen needed to control the MFR of the polymer produced in the first main polymerization reactor is fed directly into the first main polymerization reactor (usually a slurry bulk step) of the polymerisation process, instead of into the prepolymerisation step, the productivity (activity) of the catalyst in the subsequent gas phase step, and in particular a second gas phase step, is much higher than in the case where a significant portion or all hydrogen is fed to the prepolymerisation step. Overall productivity remains approximately on the same level but the activity within different reactors changes. This allows therefore an increase in the amount of polymer made in the gas phase relative to the amount of polymer made in the bulk phase—we address the bulk/GP split.

The inventors have found that the way hydrogen is distributed between the prepolymerisation and the bulk steps has clear influence on the productivities of each individual step, in particular the subsequent one or more gas phase steps. Through manipulation of hydrogen therefore, the person skilled in the art can affect the composition of the final polymer.

Thus, by changing how hydrogen is fed, that is by varying the amount of hydrogen fed in a prepolymerisation step and the amount fed into the bulk step, the catalyst productivity can be varied in each polymerisation step (although not independently). This means that, for a polymer produced in a 3-step process (i.e. a process comprising three actual polymerisation steps), such as a heterophasic propylene ethylene copolymer composition, the productivity in the second gas phase step, in which the C2/C3 copolymerisation takes place, can be increased.

The catalysts of most interest in the process of the invention are described in WO2013/007664 and WO2013/007650. Both these documents also consider the formation of heterophasic propylene ethylene copolymers based on a slurry (bulk) and single gas phase reaction. In WO2013/007664 and WO2013/007650 however, hydrogen is used in the prepolymerisation step and very small amounts of hydrogen are added at the start of the bulk polymerisation with no further hydrogen added. There is no appreciation therefore of the importance of hydrogen levels between prepolymerisation and the first main polymerisation step in terms of achieving a different balance of activity in the reactors and hence a broader window of operation and hence a manipulable composition in the final polymer.

The present inventors therefore enable a process in which the ratio of the material produced in each step can be changed, and especially the amount of copolymer produced in the last reactor of a three-reactor slurry bulk/gas phase/gas phase process can be increased without the need for increasing the residence time in this last reactor.

SUMMARY OF INVENTION

Thus viewed from one aspect the invention provides a process for the preparation of a propylene polymer in a multistage polymerisation process in the presence of a single site catalyst, said process comprising:

(I) prepolymerising a single site catalyst in the presence of propylene and optionally at least one C2-10 alpha olefin comonomer and in the presence of hydrogen or in the absence of hydrogen;

(II) in a slurry polymerisation step, polymerising propylene and optionally at least one C2-10 alpha olefin comonomer, with the prepolymerised catalyst of step (I) in the presence of hydrogen; and subsequently (III) in a gas polymerisation step polymerising propylene and optionally at least one C2-10 alpha olefin comonomer, in the presence of catalyst and polymer from step (II) and optionally in the presence of hydrogen so as to form a propylene homopolymer or copolymer;

wherein the amount of hydrogen fed to the prepolymerisation step (I) is at most 15% of the total amount of hydrogen fed to steps (I) and (II) of the polymerisation process.

Viewed from another aspect the invention provides a process for the preparation of a propylene copolymer in a multistage polymerisation process in the presence of a single site catalyst comprising:

(I) prepolymerising a single site catalyst in the presence of propylene and optionally at least one C2-10 alpha olefin comonomer and in the presence of hydrogen or in the absence of hydrogen;

(II) in a slurry polymerisation step, polymerising propylene and optionally at least one C2-10 alpha olefin comonomer with the prepolymerised catalyst of step (I) in the presence of hydrogen; and subsequently (III) in a first gas polymerisation step polymerising propylene and optionally at least one C2-10 alpha olefin comonomer in the presence of catalyst and polymer from step (II) and optionally in the presence of hydrogen; and subsequently (IV) in a second gas polymerisation step, polymerising propylene and at least one C2-10 alpha olefin comonomer in the presence of the catalyst and polymer from step (III) and optionally in the presence of hydrogen;

wherein the amount of hydrogen fed to the prepolymerisation step is at most 15% of the total amount of hydrogen fed to steps (I) and (II) of the polymerisation process.

Viewed from another aspect the invention provides a multistage polymerisation for the production of a propylene polymer in the presence of a single site catalyst and involving at least one slurry phase stage followed by at least one gas phase stage, the improvement comprising prepolymerising said catalyst in the absence of hydrogen or in the presence of hydrogen such that the amount of hydrogen fed to the prepolymerisation step is at most 15% of the total amount of hydrogen fed to the slurry phase step.

Viewed from another aspect the invention provides a propylene polymer obtained by a process as hereinbefore defined.

DETAILED DESCRIPTION OF INVENTION

The present invention relates to a multistage polymerisation process using a single site catalyst, said process comprising a prepolymerisation step, a slurry step polymerisation, preferably a slurry bulk phase polymerisation step, and at least one, preferably two gas phase polymerisation steps. The method is characterized in that all or a major part of the hydrogen used in the process is fed to the slurry polymerisation step and gas phase step(s) and little or no hydrogen is fed to prepolymerisation. Preferably the same catalyst is used in each step and ideally, it is transferred from prepolymerisation to slurry and gas phase steps in sequence as is well known, such as in a Borstar® type cascade.

The highest catalyst productivity in the gas phase polymerisation step is achieved when no hydrogen is fed in the prepolymerisation step, and hydrogen is fed directly in the bulk step.

Prepolymerisation—Stage (I)

The process of the invention requires an in-line prepolymerisation step preceding the first actual polymerisation step. This step is separate from the off-line prepolymerization of the catalyst using propylene discussed below. The catalyst off-line prepolymerization step is a part of the catalyst synthesis rather than a part of the propylene polymerisation process. The in-line prepolymerisation step takes place just before the slurry polymerisation step and may be effected in the presence of hydrogen although the concentration of hydrogen should be low if it is present. The concentration of hydrogen may be 0.01 mol % or less such as 0.01 to 0.001 mol % of the contents of the reactor. It is preferred if there is no hydrogen feed to the prepolymerisation reaction at all.

The temperature conditions within the prepolymerisation step are ideally kept low such as 0 to 50° C., preferably 5 to 40° C., more preferably 10 to 30° C.

In the prepolymerisation step, preferably propylene and optionally at least one C2-10 alpha olefin comonomer is/are polymerised. It will be appreciated that the comonomer cannot be propylene (it must be ethylene or a C4-10 alpha olefin). If present the comonomer is ideally ethylene. Most especially however, there is no comonomer and the prepolymerisation is effected using propylene only.

The residence time in the prepolymerisation reaction stage is short, typically 5 to 30 min.

The prepolymerisation stage preferably generates less than 5 wt % of the total polymer formed, such as 3 wt % or less.

Prepolymerisation preferably takes place in its own dedicated reactor, ideally in slurry. The prepolymerised catalyst is then transferred over to the slurry phase step.

Slurry Polymerisation—Step (II)

The slurry polymerisation may produce a propylene homopolymer or a propylene copolymer with a C2-10 alpha olefin. The comonomer polymerised with the propylene may therefore be ethylene or a C4-10 alpha olefin or a mixture of comonomers might be used such as a mixture of ethylene and a C4-10α-olefin.

As comonomers to propylene are preferably used ethylene, 1-butene, 1-hexene, 1-octene or any mixtures thereof, preferably ethylene. Such a copolymer made in the slurry phase polymerisation would generally have a low comonomer content such as up to 5 wt %.

It is preferred however if the slurry polymerisation step produces a homopolymer of propylene.

The slurry phase polymerisation is ideally effected in a loop reactor. Ideally, the polymerisation takes place in bulk, i.e. in a medium of liquid propylene. For slurry reactors in general and in particular for bulk reactors, the reaction temperature will generally be in the range 70 to 100° C., preferably 70 to 85° C. The reactor pressure will generally be in the range 5 to 80 bar (e.g. 20-60 bar), and the residence time will generally be in the range 0.1 to 5 hours (e.g. 0.3 to 2 hours). It is a requirement that hydrogen is used in the slurry polymerisation. The amount of hydrogen employed in the slurry phase is considerably greater than the amount used in the prepolymerisation stage. The amount of hydrogen used in prepolymerisation must be no more than 15% of the total amount used in prepolymerisation and slurry polymerisation. Preferably, the amount of hydrogen used in the prepolymerisation step is 10% or less of the amount used in prepolymeriosation and slurry, such as 5% or less.

Ideally, of course there is no hydrogen used in the prepolymerisation step.

It will be appreciated that hydrogen added to the prepolymerisation step is transferred over to the slurry phase step. Thus the amount of hydrogen in the slurry phase is the sum of that added to the prepolymerisation and that added directly to the slurry step. The amount of hydrogen consumed in the prepolymerisation step is negligible. Thus, the slurry phase contains all of the hydrogen fed in step I+step II.

Gas Phase Polymerisation Steps

There may be one gas phase polymerisation step or two or more gas phase steps. Ideally there are two gas phase steps.

A gas phase step may produce a propylene homopolymer or a propylene copolymer. If there is only one gas phase step however, then ideally the gas phase reactor produces a propylene homopolymer or a random copolymer with less than 10 wt % comonomer.

If however there are two or more gas phase steps, then the gas phase step immediately after the slurry phase step preferably produces a homopolymer or a random copolymer with less than 10 wt % comonomer, while the second gas phase reactor (step IV) can produce a random copolymer with more than 10 wt % comonomer. Most preferably there are two gas phase steps, a first step forming a propylene homopolymer or a random copolymer with less than 10 wt % comonomer, and a second forming a propylene copolymer with more than 10 wt % of at least one C2-10 alpha olefin comonomer.

The comonomer polymerised with the propylene in any gas phase step may be ethylene or a C4-10 alpha olefin or a mixture of comonomers might be used such as a mixture of ethylene and a C4-10α-olefin.

As comonomers to propylene are preferably used ethylene, 1-butene, 1-hexene, 1-octene or any mixtures thereof, preferably ethylene.

It is especially preferred if the propylene copolymer produced in the gas phase in the process of the invention is a propylene ethylene copolymer.

The propylene polymer formed in the process as whole can be a random copolymer or a heterophasic copolymer, preferably a heterophasic propylene copolymer. Heterophasic copolymers may contain a propylene homopolymer or copolymer matrix (with generally a low comonomer content) and an amorphous propylene copolymer component. It is the amorphous component that is preferably formed in at least one of the gas phase reactors. It is preferred if the matrix component is made in slurry phase and optionally also in the first gas phase if there is a second gas phase process.

The ethylene content in the polymer as a whole may be up to 20 wt %, e.g. 0.5 to 15 wt %, depending on the desired properties of the polymer. The ethylene content of the propylene copolymer made in the gas phase may be 5 to 70 wt %. If there is only one gas phase step then it may produce the amorphous component of a heterophasic copolymer if there is no further step.

A most preferred process of the invention however involves a prepolymerisation step and then three further polymerisation steps, a slurry phase (preferably bulk phase) polymerisation and two gas phase polymerisations. It will be appreciated that the slurry and/or gas phase steps can take place in the same actual reactor (with conditions changed for each step) or in different reactors. Ideally of course, a series of reactors is used. In a most preferred embodiment there are separate reactors for each of the prepolymerisation, slurry and two gas phase steps.

It is most preferred if both prepolymerisation and slurry phase steps take place in a loop reactor with a transfer to a gas phase reactor for one or more gas phase steps. If there are two or more gas phase steps then it is, on industrial scale, preferred if two separate gas phase reactors are used.

For the first gas phase reactor in the process of the invention, the reaction temperature used will generally be in the range 60 to 90° C., preferably 70 to 85° C. The reactor pressure will generally be in the range 15 to 35 bar, preferably 20 to 33 bar.

For the second and further gas phase reactor in the process of the invention, the reaction temperature used will generally be in the range 60 to 80° C., preferably 65 to 75° C. The reactor pressure will generally be in the range 10 to 33 bar, preferably 18 to 30 bar.

The residence time within any gas phase reactor will generally be 0.5 to 8 hours (e.g. 0.5 to 4 hours). The gas used will be the monomer mixture optionally as mixture with a non-reactive gas such as nitrogen or propane.

The hydrogen content within the gas phase reactors is important for controlling polymer properties but is independent of the hydrogen added to prepolymerisation and slurry steps. Hydrogen left in the slurry step can be partially vented before a transfer to the gas phase is effected, but it can also be transferred together with the slurry into the gas phase reactor, where more hydrogen can be added to control the MFR to the desired value.

The first gas phase step may or may not contain hydrogen, ideally, hydrogen is present however. When the gas phase stage is used to produce an amorphous copolymer, then the reactor is preferably operated with a lower concentration of hydrogen compared to the slurry reactor. When this reactor is the fourth step of the polymerization reaction sequence, the amount of hydrogen used is largely independent from the amount of hydrogen used in steps I and II. In this case it can be operated also in the absence of hydrogen.

Preferably it is the second gas phase polymerisation stage that takes place in the absence of hydrogen.

Thus, viewed from another aspect the invention provides a process for the preparation of a propylene copolymer in a multistage polymerisation process in the presence of a single site catalyst, said process comprising:

(I) prepolymerising a single site catalyst in the presence of propylene as sole monomer and in the presence of hydrogen or in the absence of hydrogen;

(II) in a slurry polymerisation stage, polymerising propylene only with the prepolymerised catalyst of step (I) in the presence of hydrogen; and subsequently (III) in a first gas polymerisation stage polymerising propylene only in the presence of the catalyst and polymer from step (II) and in the presence of hydrogen; and subsequently (IV) in a second gas polymerisation stage, polymerising propylene and at least one C2-10 alpha olefin comonomer in the presence of the catalyst and polymer from step (III);

wherein the amount of hydrogen fed to the prepolymerisation step is at most 15% of the total amount of hydrogen fed to the steps I+II.

The split ratios between reactors are important. In a typical known heterophasic copolymer production process, the bulk phase step produces a large excess of the overall polymer. In the present case, the ratios can be controlled over a broader range. The slurry phase may therefore produce 60 to 25 wt % of the overall polymer, preferably 50 to 30 wt %.

Generally the first gas phase polymerisation produces a higher quantity of polymer than a second gas phase stage. The split (by weight) between slurry polymer and gas phase polymer is ideally (slurry/GP1(+GP2)): 25:75 to 60:40, preferably 50:50 to 35:65. Note that any small amount of polymer formed in prepolymerisation is counted as part of the slurry polymer.

As noted above, the manipulation of hydrogen allows for the productivity within the various reactors to be manipulated.

By manipulating the hydrogen concentration we are therefore able to increase the contribution of the gas phase reactors. We can therefore produce a polymer with a larger copolymer component, without the need to increase the residence time(s) in the gas phase reactor(s).

Polymer Properties

The propylene polymers made by the process of the invention are preferably multimodal. Usually, a polymer composition comprising at least two fractions, which have been produced under different polymerisation conditions resulting in different (weight average) molecular weights and comonomer composition for the fractions, is referred to as "multimodal". Accordingly, in this sense the polymers made by the process of the invention are multimodal. The prefix "multi" relates to the number of different polymer fractions the composition is consisting of Thus, for example, a composition consisting of two fractions only is called "bimodal".

The form of the molecular weight distribution curve, i.e. the appearance of the graph of the polymer weight fraction as function of its molecular weight, of such a multimodal polymer might show two or more maxima or at least might be distinctly broadened in comparison with the curves for the individual fractions.

Multimodality is also a function of differences in comonomer composition between fractions. More preferably, the polymer made by the process of the invention is a heterophasic propylene copolymer.

The polymers made by the process of the invention may therefore have an $MFR_2$ (melt flow rate measured according to ISO1133 at 230° C. with 2.16 kg load) of 2 to 100 g/10 min., such as 10 to 75 g/10 min.

When a heterophasic copolymer composition is produced, then the xylene soluble fraction of the polymer of the invention may be 10 to 40 wt %, such as 15 to 34 wt %.

The intrinsic viscosity of the polymers of the invention may be 0.8 to 4 dl/g, such as 1.0 to 3 dl/g.

The comonomer content, preferably ethylene content, of the xylene soluble fraction of the polymer may be 10 to 70 wt %, such as 15 to 65 wt %.

Catalyst

The catalyst used in the invention can be used in non-supported form or in solid form. The catalyst of the invention should however be used as a heterogeneous (solid) catalyst.

Generally the quantity of catalyst used in the process of the invention will depend upon the nature of the catalyst, the reactor types and conditions and the properties desired for the polymer product.

The catalyst of the invention in solid form, preferably in solid particulate form can be either supported on an external carrier material, like silica or alumina, or, in a particularly preferred embodiment, is free from an external carrier, however still being in solid form. For example, the solid catalyst is obtainable by a process in which (a) a liquid/liquid emulsion system is formed, said liquid/liquid emulsion system comprising a solution of the catalyst components (i) a complex and (ii) a cocatalyst; dispersed in a solvent so as to form dispersed droplets; and (b) solid particles are formed by solidifying said dispersed droplets.

The catalyst is ideally manufactured by obtaining (i) a complex e.g. of formula (I) and (ii) a cocatalyst;

forming a liquid/liquid emulsion system, which comprises a solution of catalyst components (i) and (ii) dispersed in a solvent, and solidifying said dispersed droplets to form solid particles.

By free from an external carrier is meant that the catalyst does not contain an external support, such as an inorganic support, for example, silica or alumina, or an organic polymeric support material.

In the definitions which follow, the term $C_{1-20}$ hydrocarbyl group therefore includes $C_{1-20}$ alkyl, $C_{2-20}$ alkenyl, $C_{2-20}$ alkynyl, $C_{3-20}$ cycloalkyl, $C_{3-20}$ cycloalkenyl, $C_{6-20}$ aryl groups, $C_{7-20}$ alkylaryl groups or $C_{7-20}$ arylalkyl groups or of course mixtures of these groups such as cycloalkyl substituted by alkyl. Linear and branched hydrocarbyl groups cannot contain cyclic units. Aliphatic hydrocarbyl groups cannot contain aryl rings.

Unless otherwise stated, preferred $C_{1-20}$ hydrocarbyl groups are $C_{1-20}$ alkyl, $C_{4-20}$ cycloalkyl, $C_{5-20}$ cycloalkylalkyl groups, $C_{7-20}$ alkylaryl groups, $C_{7-20}$ arylalkyl groups or $C_{6-20}$ aryl groups, especially $C_{1-10}$ alkyl groups, $C_{6-10}$ aryl groups, or $C_{7-12}$ arylalkyl groups, e.g. $C_{1-8}$ alkyl groups. Most especially preferred hydrocarbyl groups are methyl, ethyl, propyl, isopropyl, tertbutyl, isobutyl, $C_{5-6}$-cycloalkyl, cyclohexylmethyl, phenyl or benzyl.

The term halo includes fluoro, chloro, bromo and iodo groups, especially chloro groups, when relating to the complex definition.

The oxidation state of the metal ion is governed primarily by the nature of the metal ion in question and the stability of the individual oxidation states of each metal ion.

It will be appreciated that in the complexes of the invention, the metal ion M is coordinated by ligands X so as to satisfy the valency of the metal ion and to fill its available coordination sites. The nature of these σ-ligands can vary greatly.

Catalyst activity is defined in this application to be the amount of polymer produced/g catalyst/h. The term productivity is also sometimes used to indicate the catalyst activity although herein it designates the amount of polymer produced per unit weight of catalyst.

The single site catalyst is preferably a metallocene. The preparation of the metallocene catalyst can be carried out according to or analogously to the methods known from the literature and is within the skills of an art skilled person. Said metallocenes typically bear at least one organic ligand, generally 1, 2 or 3, e.g. 1 or 2, which is η-bonded to the metal, e.g. a $\eta^{2-6}$-ligand, such as a $\eta^5$-ligand. Preferably, a metallocene is a Group 4 to 6 transition metal, suitably titanocene, zirconocene or hafnocene, which contains at least one $\eta^{2-6}$-ligand, which is e.g. an optionally substituted cyclopentadienyl, an optionally substituted indenyl, an optionally substituted tetrahydroindenyl or an optionally substituted fluorenyl.

The metallocene compound may have a formula I:

$$(Cp)_m T_n MA_q \quad (I)$$

wherein:
each Cp independently is an unsubstituted or substituted and/or fused homo- or heterocyclopentadienyl ligand, e.g. substituted or unsubstituted cyclopentadienyl, substituted or unsubstituted indenyl or substituted or unsubstituted fluorenyl ligand; the optional one or more substituent(s) being selected preferably from halogen, hydrocarbyl (e.g. $C_1$-$C_{20}$-alkyl, $C_2$-$C_{20}$-alkenyl, $C_2$-$C_{20}$-alkynyl, $C_3$-$C_{12}$-cycloalkyl, $C_6$-$C_{20}$-aryl or $C_7$-$C_{20}$-arylalkyl), $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —SiR"$_3$, —OSiR", —SR", —PR"$_2$ or —NR"$_2$, each R" is independently a hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl; or e.g. in case of —NR"$_2$, the two substituents R" can form a ring, e.g. five- or six-membered ring, together with the nitrogen atom wherein they are attached to.

T is a bridge of 1-3 atoms, e.g. a bridge of 1-2 C-atoms or 1-2 heteroatoms, wherein the heteroatom(s) can be e.g. Si, Ge and/or O atom(s), whereby each of the bridge atoms may bear independently substituents, such as $C_1$-$C_{20}$-alkyl, tri($C_1$-$C_{20}$-alkyl)silyl, tri($C_1$-$C_{20}$-alkyl)siloxy or $C_6$-$C_{20}$-aryl substituents); or a bridge of 1-3, e.g. one or two, hetero atoms, such as silicon, germanium and/or oxygen atom(s), e.g. —SiR$^1_2$, wherein each $R^1$ is independently $C_1$-$C_{20}$-alkyl, $C_6$-$C_{20}$-aryl or tri($C_1$-$C_{20}$-alkyl)silyl-residue, such as a trimethylsilyl-residue.

M is a transition metal of Group 4 to 6, such as Group 4, e.g. Ti, Zr or Hf.

Each A is independently a sigma-ligand, such as H, halogen, $C_1$-$C_{20}$-alkyl, $C_1$-$C_{20}$-alkoxy, $C_2$-$C_{20}$-alkenyl, $C_2$-$C_{20}$-alkynyl, $C_3$-$C_{12}$-cycloalkyl, $C_6$-$C_{20}$-aryl, $C_6$-$C_{20}$-aryloxy, $C_7$-$C_{20}$-arylalkyl, $C_7$-$C_{20}$-arylalkenyl, —CH$_2$—Y, wherein Y is $C_{6-20}$-aryl, $C_{6-20}$-heteroaryl, $C_{1-20}$-alkoxy, $C_{6-20}$-aryloxy, —NR"$_2$, —SiR"$_3$ or OSiR"$_3$, —PR"$_3$. —SiR"$_3$, —OSiR"$_3$ or —NR"$_2$; each R" is independently hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl; or e.g. in case of —NR", the two substituents R" can form a ring, e.g. five- or six-membered ring, together with the nitrogen atom wherein they are attached to.

Each of the above mentioned ring moieties alone or as a part of a moiety as the substituent for Cp, A, R" or $R^1$ can further be substituted e.g. with $C_1$-$C_{20}$-alkyl which may contain Si and/or O atoms;
n is 1 or 2, e.g. 1,
m is 1, 2 or 3, e.g. 1 or 2,
q is 1, 2 or 3, e.g. 2 or 3, wherein m+q is equal to the valency of M.

Whilst therefore the invention is generally applicable to a stereospecific single site catalyst, the invention is ideally used with a metallocene of formula (II). It is understood that the complex used in the invention consists of its racemic mixture.

Metallocenes of formula (II) therefore include:

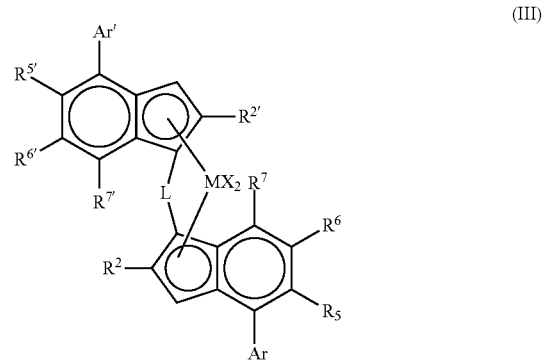

(III)

wherein

M is zirconium or hafnium;

each X is a sigma ligand;

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;

$R^2$ and $R^{2'}$ are each independently a $C_1$-$C_{20}$ hydrocarbyl radical optionally containing one or more heteroatoms from groups 14-16;

$R^5$ and $R^{5'}$ are each independently hydrogen, $C_{1-20}$ hydrocarbyl group optionally containing one or more heteroatoms from groups 14-16 and optionally substituted by one or more halo atoms;

$R^6$ and $R^{6'}$ are each independently hydrogen or a $C_{1-20}$ hydrocarbyl group optionally containing one or more heteroatoms from groups 14-16; or $R^5$ and $R^6$ taken together can form a 5 or 6 membered saturated or unsaturated carbon ring fused to the 6-membered ring of the indenyl group; or $R^{5'}$ and $R^{6'}$ taken together can form a 5 or 6 membered saturated or unsaturated carbon ring fused to the 6-membered ring of the indenyl group;

$R^7$ and $R^{7'}$ are each independently hydrogen or $C_{1-20}$ hydrocarbyl group optionally containing one or more heteroatoms from groups 14-16;

Ar is independently an aryl or heteroaryl group having up to 20 carbon atoms optionally substituted by one or more groups $R^1$;

Ar' is independently an aryl or heteroaryl group having up to 20 carbon atoms optionally substituted by one or more groups $R^1$;

each $R^1$ is a $C_{1-20}$ hydrocarbyl group or two $R^1$ groups on adjacent carbon atoms taken together can form a fused 5 or 6 membered non aromatic ring with the Ar group, said ring being itself optionally substituted with one or more groups $R^4$; and each $R^4$ is a $C_{1-20}$ hydrocarbyl group.

More preferably, the complex is of formula (III)

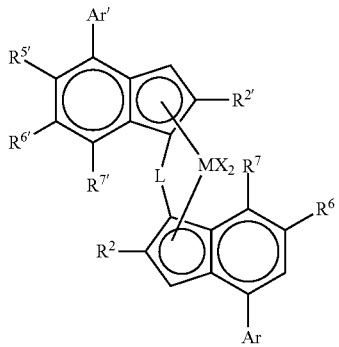

wherein
M is zirconium or hafnium;
each X is a sigma ligand;
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;
$R^2$ and $R^{2'}$ are each independently a $C_1$-$C_{20}$ hydrocarbyl radical optionally containing one or more heteroatoms from groups 14-16;
$R^{5'}$ is a $C_{1-20}$ hydrocarbyl group optionally containing one or more heteroatoms from groups 14-16 and optionally substituted by one or more halo atoms;
$R^6$ and $R^{6'}$ are each independently hydrogen or a $C_{1-20}$ hydrocarbyl group optionally containing one or more heteroatoms from groups 14-16;
$R^7$ and $R^{7'}$ are each independently hydrogen or $C_{1-20}$ hydrocarbyl group optionally containing one or more heteroatoms from groups 14-16;
Ar is independently an aryl or heteroaryl group having up to 20 carbon atoms optionally substituted by one or more groups $R^1$;
Ar' is independently an aryl or heteroaryl group having up to 20 carbon atoms optionally substituted by one or more groups $R^1$;
each $R^1$ is a $C_{1-20}$ hydrocarbyl group or two $R^1$ groups on adjacent carbon atoms taken together can form a fused 5 or 6 membered non aromatic ring with the Ar group, said ring being itself optionally substituted with one or more groups $R^4$; and
each $R^4$ is a $C_{1-20}$ hydrocarbyl group.

The complexes of the invention are symmetrical or asymmetrical, preferably asymmetrical. That means simply that the two indenyl ligands forming the metallocene are different, that is, each indenyl ligand bears a set of substituents that are either chemically different, or located in different positions with respect to the other indenyl ligand. More precisely, they are chiral, racemic bridged bisindenyl metallocenes. Whilst the complexes of the invention may be in their syn configuration ideally, they are in their anti configuration. For the purpose of this invention, racemic-anti means that the two indenyl ligands are oriented in opposite directions with respect to the cyclopentadienyl-metal-cyclopentadienyl plane, while racemic-syn means that the two indenyl ligands are oriented in the same direction with respect to the cyclopentadienyl-metal-cyclopentadienyl plane, as shown in the FIGURE below.

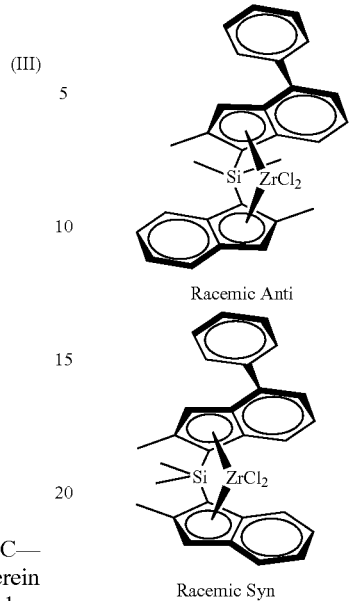

Racemic Anti

Racemic Syn

Formula (III) is intended to cover both syn and anti configurations, preferably anti. It is required in addition in compounds of formula (III), that the group $R^{5'}$ is not hydrogen where the 5-position in the other ligand carries a hydrogen.

In fact, the metallocenes of the invention are ideally $C_1$-symmetric but they maintain a pseudo-$C_2$-symmetry since they maintain $C_2$-symmetry in close proximity of the metal center, although not at the ligand periphery. As will be seen, the use of two different indenyl ligands as described in this invention allows for a much finer structural variation, hence a more precise tuning of the catalyst performance, compared to the typical $C_2$-symmetric catalysts. By nature of their chemistry, both anti and syn enantiomer pairs are formed during the synthesis of the complexes. However, by using the ligands of this invention, separation of the preferred anti isomers from the syn isomers is straightforward.

It is preferred if the metallocenes of the invention are employed as the rac anti isomer. Ideally therefore at least 95% mol, such as at least 98% mol, especially at least 99% mol of the metallocene is in the racemic anti isomeric form.

In the catalysts of the invention:
M is preferably Zr.
Each X, which may be the same or different, is preferably a hydrogen atom, a halogen atom, a R, OR, $OSO_2CF_3$, OCOR, SR, $NR_2$ or $PR_2$ group wherein R is a linear or branched, cyclic or acyclic, $C_{1-20}$ alkyl, $C_{2-20}$ alkenyl, $C_{2-20}$ alkynyl, $C_{6-20}$ aryl, $C_{7-20}$ alkylaryl or $C_{7-20}$ arylalkyl radical; optionally containing heteroatoms belonging to groups 14-16. R is preferably a $C_{1-6}$ alkyl, phenyl or benzyl group.

Most preferably each X is independently a hydrogen atom, a halogen atom, $C_{1-6}$ alkoxy group or an R group, e.g. preferably a $C_{1-6}$ alkyl, phenyl or benzyl group. Most preferably X is chlorine or a methyl radical. Preferably both X groups are the same.

L is preferably an alkylene linker or a bridge comprising a heteroatom, such as silicon or germanium, e.g. —$SiR^8_2$—, wherein each $R^8$ is independently $C_{1-20}$ alkyl, $C_{3-10}$ cycloakyl, $C_{6-20}$ aryl or tri($C_{1-20}$ alkyl)silyl, such as trimethylsilyl. More preferably $R^8$ is $C_{1-6}$ alkyl, especially methyl or $C_{3-7}$ cycloalkyl, such as cyclohexyl. Most preferably, L is a dimethylsilyl or a methylcyclohexylsilyl bridge (i.e. Me-Si-cyclohexyl). It may also be an ethylene bridge.

$R^2$ and $R^{2'}$ can be different but they are preferably the same. $R^2$ and $R^{2'}$ are preferably a $C_{1-10}$ hydrocarbyl group such as $C_{1-6}$ hydrocarbyl group. More preferably it is a linear or branched $C_{1-10}$ alkyl group. More preferably it is a linear or branched $C_{1-6}$ alkyl group, especially linear $C_{1-6}$ alkyl group such as methyl or ethyl.

The $R^2$ and $R^{2'}$ groups can be interrupted by one or more heteroatoms, such as 1 or 2 heteroatoms, e.g. one heteroatom, selected from groups 14 to 16 of the periodic table. Such a heteroatom is preferably O, N or S, especially O. More preferably however the $R^2$ and $R^{2'}$ groups are free from heteroatoms. Most especially $R^2$ and $R^{2'}$ are methyl, especially both methyl.

The two Ar groups Ar and Ar' can be the same or different. It is preferred however if the Ar groups are different. The Ar' group may be unsubstituted. The Ar' is preferably a phenyl based group optionally substituted by groups R', especially an unsubstituted phenyl group.

The Ar group is preferably a $C_{6-20}$ aryl group such as a phenyl group or naphthyl group. Whilst the Ar group can be a heteroaryl group, such as carbazolyl, it is preferable that Ar is not a heteroaryl group. The Ar group can be unsubstituted or substituted by one or more groups R', more preferably by one or two $R^1$ groups, especially in position 4 of the aryl ring bound to the indenyl ligand or in the 3, 5-positions.

In one embodiment both Ar and Ar' are unsubstituted. In another embodiment Ar' is unsubstituted and Ar is substituted by one or two groups $R^1$.

$R^1$ is preferably a $C_{1-20}$ hydrocarbyl group, such as a $C_{1-20}$ alkyl group. $R^1$ groups can be the same or different, preferably the same. More preferably, $R^1$ is a $C_{2-10}$ alkyl group such as $C_{3-8}$ alkyl group. Highly preferred groups are tert butyl or isopropyl groups. It is preferred if the group $R^1$ is bulky, i.e. is branched. Branching might be alpha or beta to the ring. Branched $C_{3-8}$ alkyl groups are also favoured therefore.

In a further embodiment, two $R^1$ groups on adjacent carbon atoms taken together can form a fused 5 or 6 membered non aromatic ring with the Ar group, said ring being itself optionally substituted with one or more groups $R^4$. Such a ring might form a tetrahydroindenyl group with the Ar ring or a tetrahydronaphthyl group.

If an $R^4$ group is present, there is preferably only 1 such group. It is preferably a $C_{1-10}$ alkyl group.

It is preferred if there is one or two $R^1$ groups present on the Ar group. Where there is one $R^1$ group present, the group is preferably para to the indenyl ring (4-position). Where two $R^1$ groups are present these are preferably at the 3 and 5 positions.

$R^5$ is preferably H.

$R^{5'}$ is preferably a $C_{1-20}$ hydrocarbyl group containing one or more heteroatoms from groups 14-16 and optionally substituted by one or more halo atoms or $R^{5'}$ is a $C_{1-10}$ alkyl group, such as methyl but most preferably it is a group $Z'R^{3'}$.

$R^6$ and $R^{6'}$ may be the same or different. In one preferred embodiment one of $R^6$ and $R^{6'}$ is hydrogen, especially $R^6$. It is preferred if $R^6$ and $R^{6'}$ are not both hydrogen. If not hydrogen, it is preferred if each $R^6$ and $R^{6'}$ is preferably a $C_{1-20}$ hydrocarbyl group, such as a $C_{1-20}$ alkyl group or $C_{6-10}$ aryl group. More preferably, $R^6$ and $R^{6'}$ are a $C_{2-10}$ alkyl group such as $C_{3-8}$ alkyl group. Highly preferred groups are tert-butyl groups. It is preferred if $R^6$ and $R^{6'}$ are bulky, i.e. are branched. Branching might be alpha or beta to the ring. Branched $C_{3-8}$ alkyl groups are also favoured therefore.

In a further embodiment, $R^5$ and $R^6$ taken together form a 5 membered carbon ring with the atoms to which they are attached.

In a further embodiment, $R^{5'}$ and $R^{6'}$ taken together form a 5 membered carbon ring with the atoms to which they are attached.

The $R^7$ and $R^{7'}$ groups can be the same or different. Each $R^7$ and $R^{7'}$ group is preferably hydrogen, a $C_{1-6}$ alkyl group or is a group $ZR^3$. It is preferred if $R^{7'}$ is hydrogen. It is preferred if $R^7$ is hydrogen, $C_{1-6}$ alkyl or $ZR^3$. The combination of both $R^7$ and $R^{7'}$ being hydrogen is most preferred. It is also preferred if $ZR^3$ represents $OC_{1-6}$ alkyl, such as methoxy. It is also preferred is $R^7$ represents $C_{1-6}$ alkyl such as methyl.

Z and Z' are O or S, preferably O.

$R^3$ is preferably a $C_{1-10}$ hydrocarbyl group, especially a $C_{1-10}$ alkyl group, or aryl group optionally substituted by one or more halo groups. Most especially $R^3$ is a $C_{1-6}$ alkyl group, such as a linear $C_{1-6}$ alkyl group, e.g. methyl or ethyl $R^{3'}$ is preferably a $C_{1-10}$ hydrocarbyl group, especially a $C_{1-10}$ alkyl group, or aryl group optionally substituted by one or more halo groups. Most especially $R^{3'}$ is a $C_{1-6}$ alkyl group, such as a linear $C_{1-6}$ alkyl group, e.g. methyl or ethyl or it is a phenyl based radical optionally substituted with one or more halo groups such as Ph or $C_6F_5$.

Thus, preferred complexes of the invention are of formula (IV') or (IV)

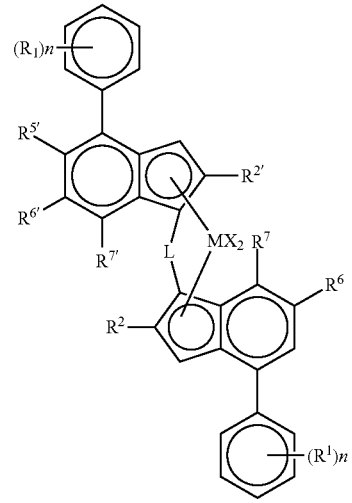

(IV')

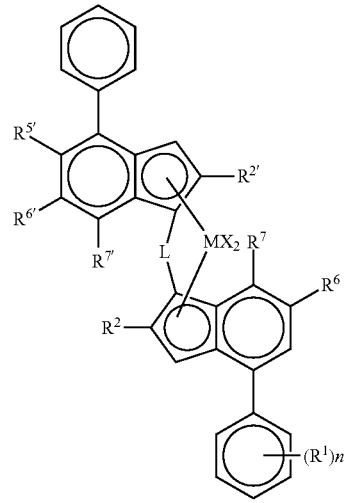

(IV)

wherein

M is zirconium or hafnium;

each X is a sigma ligand, preferably each X is independently a hydrogen atom, a halogen atom, $C_{1-6}$ alkoxy group, $C_{1-6}$ alkyl, phenyl or benzyl group;

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_{1-20}$ alkyl, $C_{3-10}$ cycloalkyl, tri($C_{1-20}$-alkyl)silyl, $C_{6-20}$-aryl, $C_{7-20}$ arylalkyl or $C_{7-20}$ alkylaryl;

each $R^2$ or $R^{2'}$ is a $C_{1-10}$ alkyl group;

$R^5$ is a $C_{1-10}$ alkyl group or $Z'R^{3'}$ group;

$R^6$ is hydrogen or a $C_{1-10}$ alkyl group;

$R^{6'}$ is a $C_{1-10}$ alkyl group or $C_{6-10}$ aryl group;

$R^7$ is hydrogen, a $C_{1-6}$ alkyl group or $ZR^3$ group;

$R^{7'}$ is hydrogen or a $C_{1-10}$ alkyl group;

Z and Z' are independently O or S;

$R^{3'}$ is a $C_{1-10}$ alkyl group, or a $C_{6-10}$ aryl group optionally substituted by one or more halo groups;

$R^3$ is a $C_{1-10}$-alkyl group;

each n is independently 0 to 4, e.g. 0, 1 or 2;

and each $R^1$ is independently a $C_{1-20}$ hydrocarbyl group, e.g. $C_{1-10}$ alkyl group.

Viewed from another aspect the invention provides a complex of formula (V') or (V):

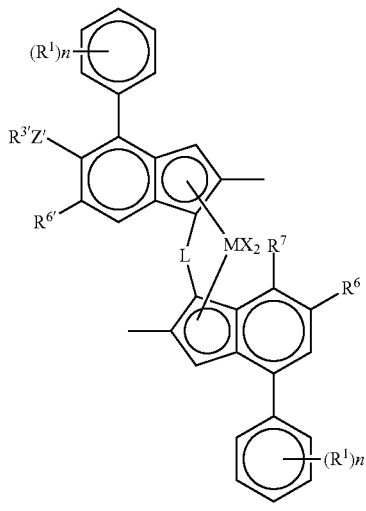

(V')

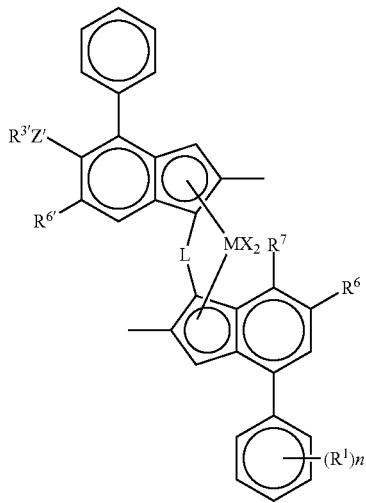

(V)

M is zirconium or hafnium;

each X is a sigma ligand, preferably each X is independently a hydrogen atom, a halogen atom, $C_{1-6}$ alkoxy group, $C_{1-6}$ alkyl, phenyl or benzyl group;

L is a divalent bridge selected from —R'$_2$C— or —R'$_2$Si— wherein each R' is independently a hydrogen atom, $C_{1-20}$ alkyl or $C_{3-10}$ cycloalkyl;

$R^6$ is hydrogen or a $C_{1-10}$ alkyl group;

$R^{6'}$ is a $C_{1-10}$ alkyl group or $C_{6-10}$ aryl group;

$R^7$ is hydrogen, $C_{1-6}$ alkyl or $OC_{1-6}$ alkyl;

Z' is O or S;

$R^{3'}$ is a $C_{1-10}$ alkyl group, or $C_{6-10}$ aryl group optionally substituted by one or more halo groups;

n is independently 0 to 4, e.g. 0, 1 or 2; and each $R^1$ is independently a $C_{1-10}$ alkyl group.

Viewed from a further preferred aspect the invention provides a complex of formula (VP) or (VI):

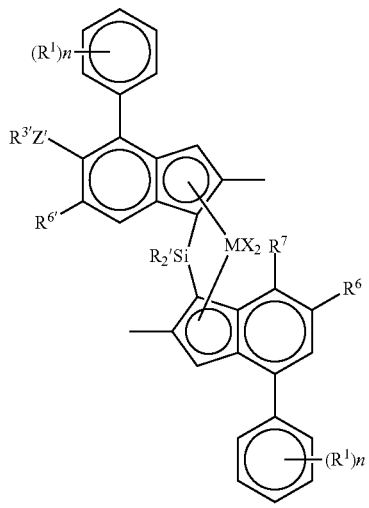

(VI')

(VI)

M is zirconium or hafnium;

each X is a sigma ligand, preferably each X is independently a hydrogen atom, a halogen atom, $C_{1-6}$-alkoxy group, $C_{1-6}$-alkyl, phenyl or benzyl group;

each R' is independently a hydrogen atom, $C_{1-20}$ alkyl or $C_{3-7}$ cycloalkyl;

$R^6$ is hydrogen or a $C_{1-10}$ alkyl group;

$R^{6'}$ is a $C_{1-10}$ alkyl group or $C_{6-10}$ aryl group;

$R^7$ is hydrogen, $C_{1-6}$ alkyl or $OC_{1-6}$ alkyl;

Z' is O or S;

R$^{3'}$ is a C$_{1-10}$ alkyl group, or C$_{6-10}$ aryl group optionally substituted by one or more halo groups;

n is independently 0, 1 to 2; and each R$^1$ is independently a C$_{3-8}$ alkyl group.

Most especially, the complex of the invention is of formula (VIP) or (VII):

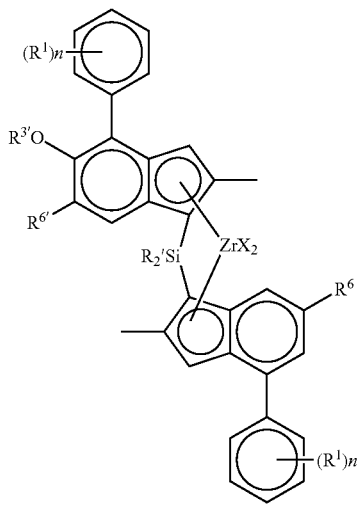

(VII')

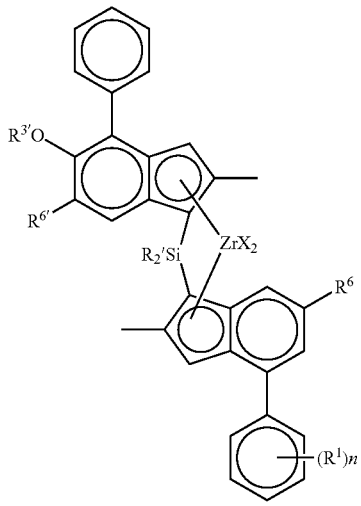

(VII)

wherein each X is a sigma ligand, preferably each X is independently a hydrogen atom, a halogen atom, C$_{1-6}$-alkoxy group, C$_{1-6}$-alkyl, phenyl or benzyl group;

R' is independently a C$_{1-6}$ alkyl or C$_{3-10}$ cycloalkyl;

R$^1$ is independently C$_{3-8}$ alkyl;

R$^6$ is hydrogen or a C$_{3-8}$ alkyl group;

R$^{6'}$ is a C$_{3-8}$ alkyl group or C$_{6-10}$ aryl group;

R$^{3'}$ is a C$_{1-6}$ alkyl group, or C$_{6-10}$ aryl group optionally substituted by one or more halo groups; and n is independently 0, 1 or 2.

Particular compounds of the invention include:

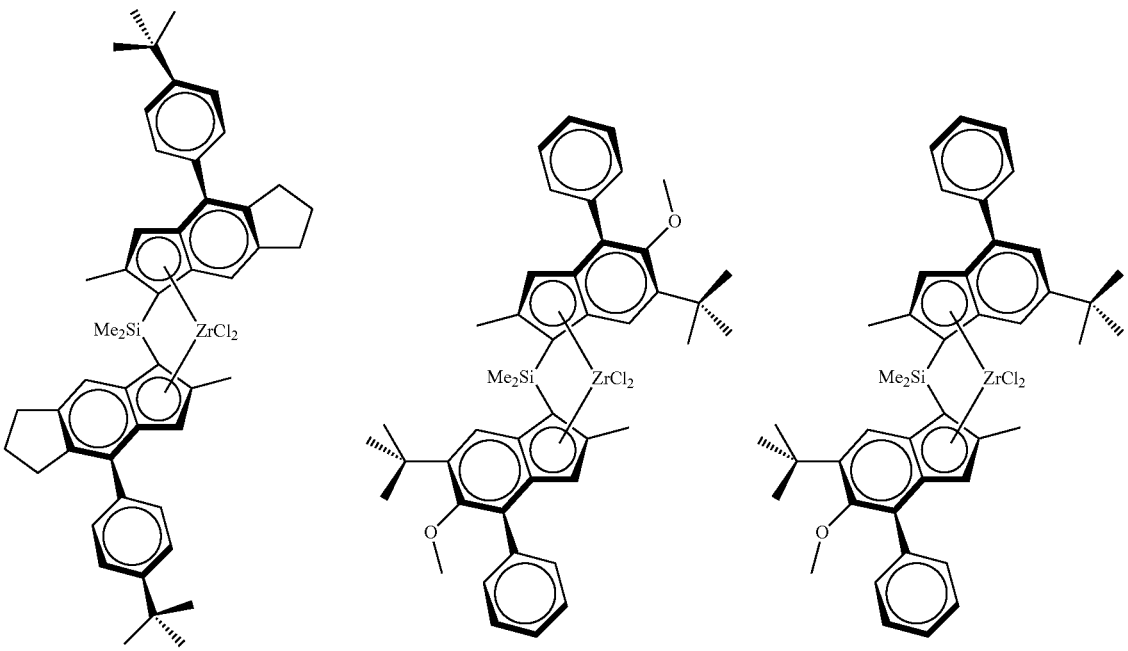

| rac-dimethylsilanediylbis[2-methyl-4-(4-tert-butylphenyl)-1,5,6,7-tetrahydro-s-indacen-1-yl]zirconium dichloride | rac-dimethylsilanediylbis(2-methyl-4-phenyl-5-methoxy-6-tert-butylinden-1-yl)zirconium dichloride | rac-anti-Me$_2$Si(2-Me-4-Ph-6-tBu-Ind)(2-Me-4-Ph-5-OMe-6-tBu-Ind)ZrCl$_2$ |

-continued
| | | |
|---|---|---|
| 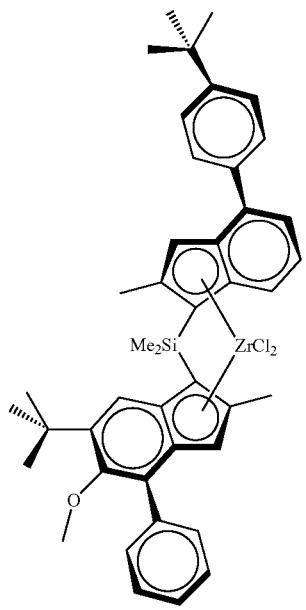 | 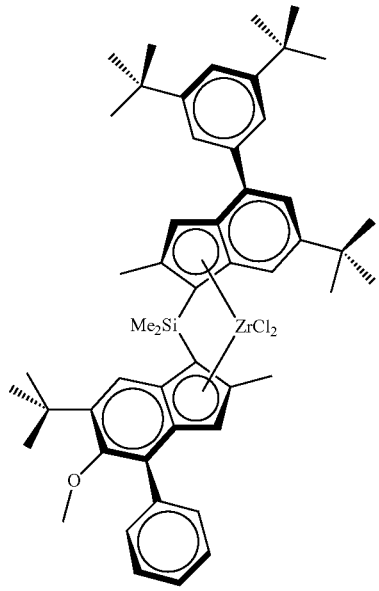 | 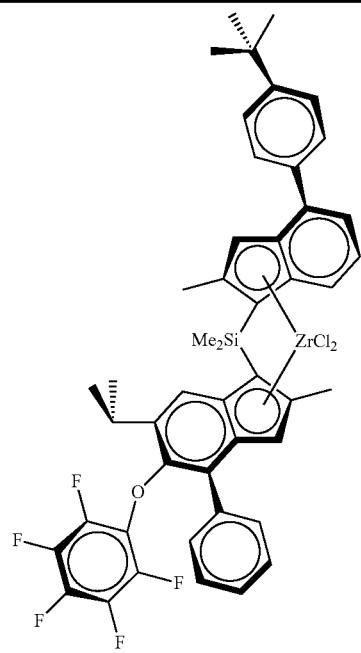 |
| rac-anti-Me$_2$Si(2-Me-4-(p-tBuPh)-Ind)(2-Me-4-Ph-5-OMe-6-tBu-Ind)ZrCl$_2$ | rac-anti-Me$_2$Si(2-Me-4-(3,5-di-tBuPh)-6-tBu-Ind)(2-Me-4-Ph-5-OMe-6-tBu-Ind)ZrCl$_2$ | rac-anti-Me$_2$Si(2-Me-4-(p-tBuPh)-Ind)(2-Me-4-Ph-5-OC$_6$F$_5$)-6-iPr-Ind)ZrCl$_2$ |
| 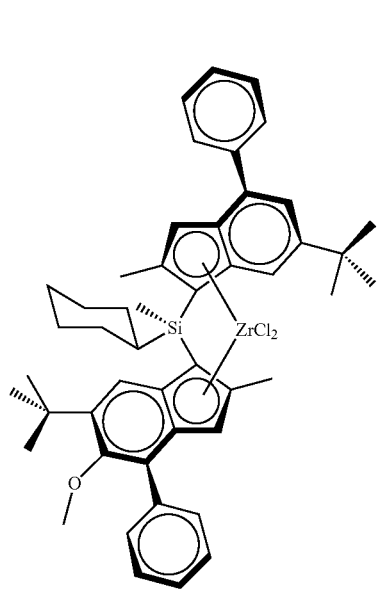 | 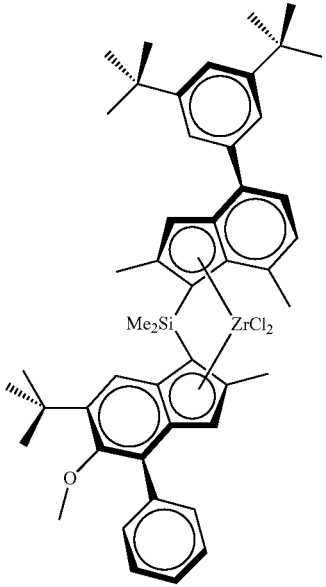 | 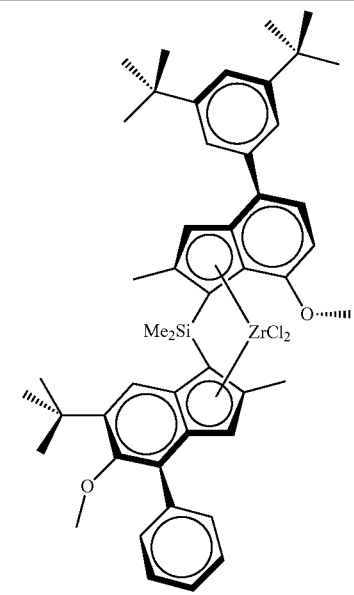 |
| rac-anti-Me(CyHex)Si(2-Me-4-Ph-6-tBu-Ind)(2-Me-4-Ph-5-OMe-6-tBu-Ind)ZrCl$_2$ | rac-anti-Me$_2$Si(2-Me-4-(3,5-di-tBuPh)-7-Me-Ind)(2-Me-4-Ph-5-OMe-6-tBu-Ind)ZrCl$_2$ | rac-anti-Me$_2$Si(2-Me-4-(3,5-di-tBuPh)-7-OMe-Ind)(2-Me-4-Ph-5-OMe-6-tBu-Ind)ZrCl$_2$ |

-continued
| | | |
|---|---|---|
| 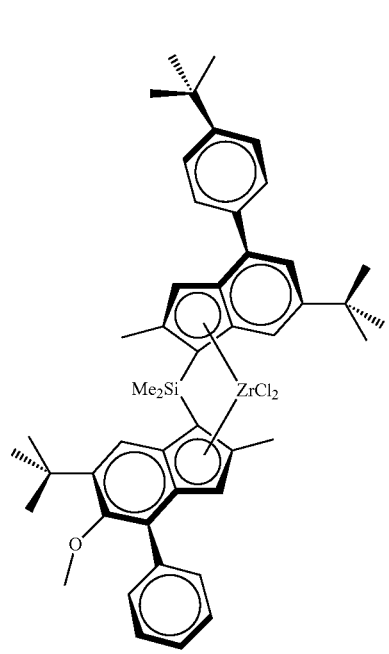 | 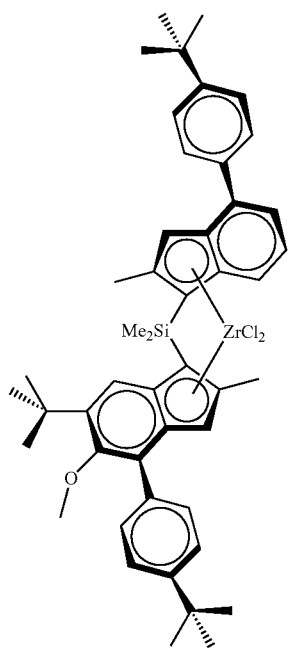 | 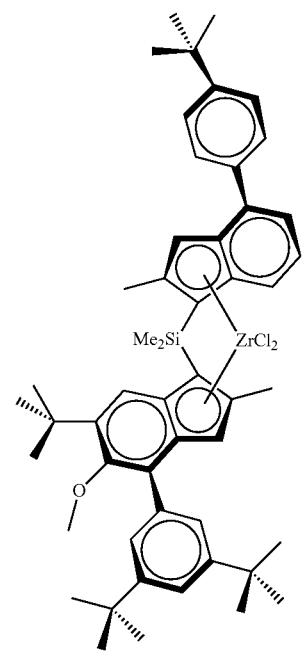 |
| rac-anti-Me₂Si(2-Me-4-(p-tBuPh)-6-tBu-Ind)(2-Me-4-Ph-5-OMe-6-tBu-Ind)ZrCl₂ | rac-anti-Me₂Si(2-Me-4-(p-tBuPh)-Ind)(2-Me-4-(4-tBuPh)-5-OMe-6-tBu-Ind)ZrCl₂ | rac-anti-Me₂Si(2-Me-4-(p-tBuPh)-Ind)(2-Me-4-(3,5-tBu2Ph)-5-OMe-6-tBu-Ind)ZrCl₂ |
| | | 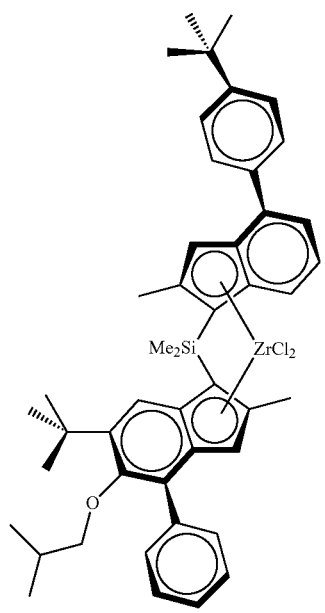 |
| | | rac-anti-Me₂Si(2-Me-4-(p-tBuPh)-Ind)(2-Me-4-Ph-5-OiBu-6-tBu-Ind)ZrCl₂ |

For the avoidance of doubt, any narrower definition of a substituent offered above can be combined with any other broad or narrowed definition of any other substituent.

Throughout the disclosure above, where a narrower definition of a substituent is presented, that narrower definition is deemed disclosed in conjunction with all broader and narrower definitions of other substituents in the application.

These catalysts can be made following the principles in WO2013/007650.

Cocatalyst

To form an active catalytic species it is normally necessary to employ a cocatalyst as is well known in the art. Again, cocatalysts are described in detail in WO2013/007650.

Cocatalysts comprising one or more compounds of Group 13 metals, like organoaluminium compounds or borates used to activate metallocene catalysts are suitable for use in this invention.

The olefin polymerisation catalyst system of the invention comprises (i) a complex in which the metal ion is coordinated by a ligand of the invention; and normally (ii) an aluminium alkyl compound (or other appropriate cocatalyst), or the reaction product thereof. Thus the cocatalyst is preferably an alumoxane, like MAO or an alumoxane other than MAO.

Borate cocatalysts can also be employed. It will be appreciated by the skilled man that where boron based cocatalysts are employed, it is normal to preactivate the complex by reaction thereof with an aluminium alkyl compound, such as TIBA. This procedure is well known and any suitable aluminium alkyl, e.g. $Al(C_{1-6}\text{-alkyl})_3$ can be used.

The use of $B(C_6F_5)_3$, $C_6H_5N(CH_3)_2H:B(C_6F_5)_4$, $(C_6H_5)_3C:B(C_6F_5)_4$ or $Ni(CN)_4[B(C_6F_5)_3]_4{}^{2-}$ is especially preferred.

Suitable amounts of cocatalyst will be well known to the skilled man.

Catalyst Manufacture

The catalyst of the invention can be used in supported or unsupported form. The particulate support material used is preferably an organic or inorganic material, such as silica, alumina or zirconia or a mixed oxide such as silica-alumina, in particular silica, alumina or silica-alumina. The use of a silica support is preferred. The skilled man is aware of the procedures required to support a metallocene catalyst.

Especially preferably the support is a porous material so that the complex may be loaded into the pores of the support, e.g. using a process analogous to those described in WO94/14856 (Mobil), WO95/12622 (Borealis) and WO2006/097497. The particle size is not critical but is preferably in the range 5 to 200 µm, more preferably 20 to 80 µm. The use of these supports is routine in the art.

In an alternative embodiment no external carrier is used but the catalyst is still presented in solid particulate form. Thus no external support material such as inert organic or inorganic carrier, such as for example silica as described above is employed.

In order to provide the catalyst of the invention in solid form but without using an external carrier, it is preferred if a liquid/liquid emulsion system is used. The process involves forming dispersing catalyst components (i) and (ii) in a solvent, and solidifying said dispersed droplets to form solid particles.

In particular, the method involves preparing a solution of one or more catalyst components; dispersing said solution in an solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles.

This process enables the manufacture of active catalyst particles with improved morphology, e.g. with a predetermined spherical shape, surface properties and particle size and without using any added external porous support material, such as an inorganic oxide, e.g. silica. By the term "preparing a solution of one or more catalyst components" is meant that the catalyst forming compounds may be combined in one solution which is dispersed to the immiscible solvent, or, alternatively, at least two separate catalyst solutions for each part of the catalyst forming compounds may be prepared, which are then dispersed successively to the solvent.

In a preferred method for forming the catalyst at least two separate solutions for each or part of said catalyst may be prepared, which are then dispersed successively to the immiscible solvent.

More preferably, a solution of the complex comprising the transition metal compound and the cocatalyst is combined with the solvent to form an emulsion wherein that inert solvent forms the continuous liquid phase and the solution comprising the catalyst components forms the dispersed phase (discontinuous phase) in the form of dispersed droplets. The droplets are then solidified to form solid catalyst particles, and the solid particles are separated from the liquid and optionally washed and/or dried. The solvent forming the continuous phase may be immiscible to the catalyst solution at least at the conditions (e. g. temperatures) used during the dispersing step.

The term "immiscible with the catalyst solution" means that the solvent (continuous phase) is fully immiscible or partly immiscible i.e. not fully miscible with the dispersed phase solution.

Preferably said solvent is inert in relation to the compounds of the catalyst system to be produced. Full disclosure of the necessary process can be found in WO03/051934 which is herein incorporated by reference.

All or part of the preparation steps can be done in a continuous manner Reference is made to WO2006/069733 describing principles of such a continuous or semicontinuous preparation methods of the solid catalyst types, prepared via emulsion/solidification method.

Catalyst Off-line Prepolymerisation

The use of the heterogeneous, non-supported catalysts, (i.e. "self-supported" catalysts) might have, as a drawback, a tendency to dissolve to some extent in the polymerisation media, i.e. some active catalyst components might leach out of the catalyst particles during slurry polymerisation, whereby the original good morphology of the catalyst might be lost. These leached catalyst components are very active possibly causing problems during polymerisation. Therefore, the amount of leached components should be minimized, i.e. all catalyst components should be kept in heterogeneous form.

Furthermore, the self-supported catalysts generate, due to the high amount of catalytically active species in the catalyst system, high temperatures at the beginning of the polymerisation which may cause melting of the product material. Both effects, i.e. the partial dissolving of the catalyst system and the heat generation, might cause fouling, sheeting and deterioration of the polymer material morphology.

In order to minimise the possible problems associated with high activity or leaching, it is preferred to "off line prepolymerise" the catalyst before using it in polymerisation process.

It has to be noted that off line prepolymerisation in this regard is part of the catalyst preparation process, being a step carried out after a solid catalyst is formed.

This catalyst off line prepolymerisation step is not part of the actual polymerisation configuration, which comprises a prepolymerisation step. After the catalyst off line prepolymerisation step, a solid catalyst is obtained and used in polymerisation.

Catalyst "off line prepolymerisation" takes place following the solidification step of the liquid-liquid emulsion process. Pre-polymerisation may take place by known methods described in the art, such as that described in WO 2010/052263, WO 2010/052260 or WO 2010/052264. Preferable embodiments of this aspect of the invention are described herein.

As monomers in the catalyst off-line prepolymerisation step preferably alpha-olefins are used. Preferable $C_2$-$C_{10}$ olefins, such as ethylene, propylene, 1-butene, 1-pentene, 1-hexene, 4-methyl-1-pentene, 1-heptene, 1-octene, 1-nonene 1-decene, styrene and vinylcyclohexene are used. Most preferred alpha-olefins are ethylene and propylene, especially propylene.

The catalyst off-line prepolymerisation may be carried out in gas phase or in an inert diluent, typically oil or fluorinated hydrocarbon, preferably in fluorinated hydrocarbons or mixture of fluorinated hydrocarbons. Preferably perfluorinated hydrocarbons are used. The melting point of such (per) fluorinated hydrocarbons is typically in the range of 0 to 140° C., preferably 30 to 120° C., like 50 to 110° C.

Where the catalyst off line prepolymeriseation is done in fluorinated hydrocarbons, the temperature for the pre-polymerisation step is below 70° C., e.g. in the range of −30 to 70° C., preferably 0-65° C. and more preferably in the range 20 to 55° C. Pressure within the reaction vessel is preferably higher than atmospheric pressure to minimize the eventual leaching of air and/or moisture into the catalyst vessel. Preferably the pressure is in the range of at least 1 to 15 bar, preferably 2 to 10 bar. The reaction vessel is preferably kept in an inert atmosphere, such as under nitrogen or argon or similar atmosphere.

Off line prepolymerisation is continued until the pre-polymerisation degree defined as weight of polymer matrix/weight of solid catalyst before pre-polymerisation step is reached. The degree is below 25, preferably 0.5 to 10.0, more preferably 1.0 to 8.0, most preferably 2.0 to 6.0.

Use of the off-line catalyst prepolymerisation step offers the advantage of minimising leaching of catalyst components and thus local overheating.

After off line prepolymerisation, the catalyst can be isolated and stored.

Applications

The polymers of the invention are useful in the manufacture of a variety of end articles such as films (cast, blown or BOPP films), moulded articles (e.g. injection moulded, blow moulded, rotomoulded articles), extrusion coatings and so on. Preferably, polymers made by the process of the invention are used in packaging or automotive applications. Packaging of interest include heavy duty sacks, hygiene films, lamination films, and soft packaging films.

Due to their excellent low temperature impact properties, polymer compositions of the invention are ideal for use in food packaging or automotive parts.

The invention will now be described with reference to the following non limiting examples and figures. FIG. 1 shows the influence of hydrogen split between prepolymerisation and bulk step on the productivities of each individual step.

Analytical Tests

The elemental analysis of a catalyst was performed by taking a solid sample of deactivated catalyst of mass, M, cooling over dry ice. Samples were diluted up to a known volume, V, by dissolving in nitric acid ($HNO_3$, 65%, 5% of V) and freshly deionised (DI) water (5% of V). The solution was then added to hydrofluoric acid (HF, 40%, 3% of V), diluted with DI water up to the final volume, V, and left to stabilise for two hours.

The analysis was run at room temperature using a Thermo Elemental iCAP 6300 Inductively Coupled Plasma—Optical Emission Spectrometer (ICP-OES) which was calibrated using a blank (a solution of 5% $HNO_3$, 3% HF in DI water), and 6 standards of 0.5 ppm, 1 ppm, 10 ppm, 50 ppm, 100 ppm and 300 ppm of Al, with 0.5 ppm, 1 ppm, 5 ppm, 20 ppm, 50 ppm and 100 ppm of Zr in solutions of 5% $HNO_3$, 3% HF in DI water.

Immediately before analysis the calibration is 'resloped' using the blank and 100 ppm Al, 50 ppm Hf, Zr standard, a quality control sample (20 ppm Al, 5 ppm Hf, Zr in a solution of 5% $HNO_3$, 3% HF in DI water) is run to confirm the reslope. The QC sample is also run after every $5^{th}$ sample and at the end of a scheduled analysis set.

The content of zirconium was monitored using 339.198 nm line. The content of aluminium was monitored via the 167.079 nm line, when Al concentration in ICP sample was between 0-10 ppm (calibrated only to 100 ppm) and via the 396.152 nm line for Al concentrations above 10 ppm.

The reported values are an average of three successive aliquots taken from the same sample and are related back to the original catalyst by inputting the original mass of sample and the dilution volume into the software.

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 230° C. and may be determined at different loadings such as 2.16 kg ($MFR_2$) or 21.6 kg ($MFR_{21}$).

Intrinsic viscosity is measured according to DIN ISO 1628/1, October 1999 (in Decalin at 135° C.).

Determination of Xylene Soluble Fraction (XS):

2.0 g of polymer is dissolved in 250 ml p-xylene at 135° C. under agitation. After 30 minutes the solution is allowed to cool for 15 minutes at ambient temperature and then allowed to settle for 30 minutes at 25° C. The solution is filtered with filter paper into two 100 ml flasks.

The solution from the first 100 ml vessel is evaporated in nitrogen flow and the residue is dried under vacuum at 90° C. until constant weight is reached.

XS %=(100·m·Vo)/(mo·v); mo=initial polymer amount (g); m=weight of residue (g); Vo=initial volume (ml); v=volume of analysed sample (ml).

Ethylene Content (FTIR $C_2$)

Ethylene content was measured with Fourier transform infrared spectroscopy (FTIR) calibrated to results obtained by $^{13}C$ NMR spectroscopy using a method which accounts for regio-irregular propene insertion. When measuring the ethylene content in polypropylene, a thin film of the sample (thickness about 0.220 to 0.250 mm) was prepared by hotpressing at 230° C. (preheat 5 min., press 1 min., cooling (cold water) 5 min) using a Graseby Specac press. The FTIR spectra of the sample was recorded immediately with Nicolet Protégé 460 spectrometer from 4000 to 400 $cm^{-1}$, resolution 4 $cm^{-1}$, scans 64. The area of absorption peak at 733 $cm^{-1}$ (baseline from 700 $cm^{-1}$ to 760 $cm^{-1}$) and height of reference peak at 809 cm$^{-1}$ (baseline from 780 cm$^{-1}$ to 880 cm$^{-1}$) were evaluated. The result was calculated using the following formula $$E_{tot} = a \times A/R + b$$

where

A=area of absorption peak at 733 cm$^{-1}$
R=height of reference peak at 809 cm$^{-1}$
$E_{tot}$=C2 content (wt.-%)

a, b are calibration constants determined by correlation of multiple calibration standards of know ethylene content as determined by $^{13}$C NMR spectroscopy to A/R.

The result was reported as an average of two measurements.

EXAMPLES

All the chemicals and chemical reactions were handled under an inert gas atmosphere using Schlenk and glovebox techniques, with oven-dried glassware, syringes, needles or cannulas.

MAO was purchased from Albermarle and used as a 30 wt-% solution in toluene. Perfluoroalkylethyl acrylate ester mixture (CAS number 65605-70-1) was purchased from the Cytonix corporation, dried over activated molecular sieves (2 times) and degassed by argon bubbling prior to use.

Hexadecafluoro-1,3-dimethylcyclohexane (PFC) (CAS number 335-27-3) was obtained from commercial sources and dried over activated molecular sieves (2 times) and degassed by argon bubbling prior to use.

Triethylaluminum was purchased from Aldrich and used as a 1 M solution in n-hexane. Hydrogen is provided by Air Liquide and purified before use. Propylene is provided by Borealis and purified before use.

Complex:

As metallocene complex was used the racemic anti-dimethylsilanediyl[2-methyl-4-(4-tert-butylphenyl)-inden-1-yl][2-methyl-4-(4-tert-butylphenyl)-5-methoxy-6-tert-butyl-inden-1-yl]zirconium dichloride (MC1) according to the following formula

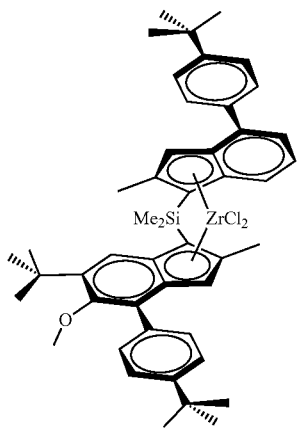

Synthesis of racemic anti-dimethylsilanediyl[2-methyl-4-(4-tert-butylphenyl)-inden-1-yl][2-methyl-4-(4-tert-butylphenyl)-5-methoxy-6-tert-butyl-inden-1-yl]zirconium dichloride can be found in WO2013/007650.

Catalyst Preparation:

Inside the glovebox, 54 µL of dry and degassed mixture of perfluoroalkylethyl acrylate ester (used as surfactant) were mixed with 2 mL of MAO in a septum bottle and left to react overnight. The following day, 44.50 mg of metallocene MC1 (0,051 mmol, 1 equivalent) were dissolved with 4 mL of the MAO solution in another septum bottle and left to stir inside the glovebox.

After 60 minutes, 1 mL of the surfactant solution and the 4 mL of the MAO-metallocene solution were successively added into a 50 mL emulsification glass reactor containing 40 mL of PFC at −10° C. and equipped with an overhead stirrer (stirring speed=600 rpm). Total amount of MAO is 5 mL (450 equivalents). A red emulsion formed immediately and stirred during 15 minutes at −10° C./600 rpm.

Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 1.0 g of a red solid catalyst was obtained.

Off-Lline Pre-activation Procedure

The catalyst as prepared above (MC1-Cat) was pre-polymerised according to the following procedure Off-line pre-polymerisation experiments were done in a 125 mL pressure reactor equipped with gas-feeding lines and an overhead stirrer. Dry and degassed perfluoro-1,3-dimethyl-cyclohexane (PFC)(15 ml) and the desired amount of the catalyst MC1-Cat (604.6 mg) to be pre-polymerised were loaded into the reactor inside a glove box and the reactor was sealed. The reactor was then taken out from the glove box and placed inside a water cooled bath kept at 25° C. The overhead stirrer and the feeding lines were then connected. The experiment was started by opening the propylene feed into the reactor and setting the stirrer speed at 450 rpm. The propylene feed was left open and the monomer consumption was compensated by keeping the total pressure in the reactor constant (about 5 barg). The experiment was continued for the polymerisation time (17.5 min) sufficient to provide the desired degree of polymerisation (DP). The reactor was then taken back inside the glove box before opening and the content was poured into a glass vessel. PFC was evaporated until a constant weight was obtained to yield 2.90 g of the pre-polymerised catalyst. The degree of polymerisation (DP) was determined gravimetrically and/or by analysis of the ash and/or aluminium content of the catalyst. Pre-polymerization degree is 3.8 g(PP)/g(cat). Prepolymerised MC1-Cat is marked as PMC1-Cat The catalyst used and its composition is listed in table 1:

TABLE 1

| Catalyst type | DP g/g | MC1 wt % |
|---|---|---|
| PMC1-cat | 3.8 | 0.65 |

Polymerisation Examples

Heterophasic compositions have been prepared by means of a 3-step polymerization process (bulk PP homopolymer+ gas phase (GP1) PP homopolymer+gas phase (GP2) C2/C3 copolymer) in a 20-L reactor, as described below.

Step 1: Prepolymerisation

A stirred autoclave (double helix stirrer) with a volume of 21.2 dm$^3$ containing 0.2 barg propylene, was filled with additional 3.97 kg propylene plus the chosen amount of H2 (see table 2). After adding 0.73 mmol triethylaluminium (Aldrich, 1 molar solution in n-hexane) using a stream of 250 g propylene, the solution was stirred at 20° C. and 250 rpm for 20 min. Then the catalyst was injected as described in the following. The solid, pre-polymerized catalyst (PMC1-Cat) (amount as listed in table 2) was loaded into a 5-mL stainless steel vial inside the glovebox, the vial was attached to the autoclave, then a second 5-mL vial containing 4 ml n-hexane and pressurized with 10 bars of N2 was added on top, the valve between the two vials was opened and the solid catalyst was contacted with hexane under N2 pressure for 2 s, then flushed into the reactor with 250 g propylene. Stirring speed was increased to 250 rpm and pre-polymerisation was run for 10 min at 20° C.

Step 2: Bulk Propylene Homopolymerization

At the end of the prepolymerization step, the stirring speed was increased to 350 rpm and the polymerisation temperature increased to 80° C. When the internal reactor temperature reached 71° C., the chosen H2 amount (as indicated in Table 2) was added with a defined flow via thermal mass flow controller (MFC). The reactor temperature was held constant throughout the polymerization. The polymerization time was measured starting when the temperature was 2° C. below the set polymerization temperature.

Step 3: Gas Phase Propylene Homopolymerization (GP1)

After the bulk step was finished, the stirrer speed was adjusted to 50 rpm and the reactor pressure was reduced to 0.5 bar below the set pressure by venting. Afterwards the stirrer speed was set to 180 rpm, the reactor temperature to 80° C. and the chosen amount of H2 was dosed via MFC. Then the reactor P and T were held constant by propylene feed via MFC until the target split had been reached.

Step 4: Gas Phase Ethylene/Propylene Copolymerization (GP2)

When the GP1 had been finished, the stirrer speed was reduced to 50 rpm. The reactor pressure was lowered to 0.3 bar by venting, the temperature and control device was set to 70° C. Then the reactor was filled with 200 g propylene at a flow of 70 g/min and flushed again to 0.3 barg.

Afterwards the stirrer speed was adjusted to 180 rpm. Then the reactor was filled with an ethylene/propylene ratio of 0.74 g/g (transition feed). The C2/C3 ratio in the transition depends on the relative reactivity ratio of the two comonomers (R(C2/C3)), specific of each catalyst system. The speed of the reactor filling during the transition was limited by the max. flow of the gas flow controllers. When the reactor temperature reached 69° C. and the reactor pressure reached the set value, the composition of the fed C2/C3 mixture was changed to the target copolymer composition (20/80 by weight) and temperature and pressure were held constant as long as a fixed amount of C23/C3 gas mixture had been consumed to reach the target rubber split.

The reaction was stopped by setting the stirrer speed to 20 rpm, cooling the reactor to 30° C. and flashing the volatile components.

After flushing the reactor twice with N$_2$ and one vacuum/N$_2$ cycle, the product was taken out and dried overnight in a fume hood. 100 g of the polymer was additivated with 0.2 wt % Ionol and 0.1 wt % Sandostab PEPQ (dissolved in acetone) and then dried overnight in a hood plus 2 hours in a vacuum drying oven at 60° C. The polymerization conditions and step productivities are summarized in table 2.

The results of polymer analysis are listed in table 3.

Based on the results of table 2 it is evident that, when H$_2$ is fed mostly into the bulk step instead of prepolymerisation step, the productivity (activity) of the catalyst in the second gas phase step is much higher than in case where a larger amount of hydrogen is fed to the prepolymerisation step. Overall productivity remains approximately on the same level.

The influence of H$_2$ split is shown in FIG. 1. It can be seen that H$_2$ split between prepolymerisation and bulk step has clear influence on the productivities of each individual step.

TABLE 2

| Example | Catalyst amount PMC1-cat mg | PREPOLYMERIZATION, 20° C., 10 min | | SLURRY BULK 80° C. | | | H2 ratio (step I/step I + H) | GP1: T = 80° C. P = 25 barg | | |
|---|---|---|---|---|---|---|---|---|---|---|
| | | H2 NL | H2 conc. mol % | Total H2 NL | H2 conc. mol % | time min | | H2 NL | H2 conc. mol % | time min |
| CE1 | 152 | 3.0 | 0.126 | 3.0 | 0.061 | 20 | 1 | 1.1 | 0.190 | 127 |
| CE2 | 150 | 0.5 | 0.020 | 3.0 | 0.061 | 20 | 0.167 | 1.1 | 0.190 | 97 |
| IE1 | 128 | 0.1 | 0.005 | 3.0 | 0.061 | 20 | 0.033 | 1.1 | 0.190 | 108 |
| IE2 | 152 | 0 | 0.000 | 3.0 | 0.061 | 20 | 0 | 1.1 | 0.190 | 67 |

| Example | GP2 (C2/C3): T = 70° C. P = 20 barg NO H2 time min | Overall Productivity kg/g cat | Productivity in bulk 20 min kgPP/g cat | Productivity in GP1 60 min kgPP/g cat | Productivity in GP2 100 min kgPP/g cat | Productivity 20 min bulk + 60 min GP1 + 100 min GP2 kgPP/g cat |
|---|---|---|---|---|---|---|
| CE1 | 119 | 9.2 | 6.7 | 0.9 | 0.4 | 8.0 |
| CE2 | 118 | 8.9 | 5.9 | 1.6 | 0.7 | 8.2 |
| IE1 | 151 | 10.0 | 4.2 | 2.6 | 1.3 | 8.2 |
| IE2 | 116 | 8.9 | 3.5 | 2.6 | 2.1 | 8.2 |

TABLE 3

| Example | MFR2 whole g/10 min | split slurry bulk step II % | split GP1 step III % | split GP2 step IV % | XS w % | IV (XS) dL/g | C2(XS) from IR(XS) wt % |
|---|---|---|---|---|---|---|---|
| CE1 | 8.2 | 72 | 16 | 12 | 13.9 | 2.42 | 19.5 |
| CE2 | 13.5 | 66 | 23 | 10 | 12.8 | 2.16 | 19.8 |
| IE1 | 18.5 | 43 | 39 | 18 | 22.8 | 2.10 | 19.8 |
| IE2 | 18.3 | 39 | 32 | 28 | 30.6 | 2.05 | 20.4 |

The invention claimed is:

1. A process for the preparation of a propylene copolymer in a multistage polymerisation process in the presence of a single site catalyst comprising:
   (I) prepolymerising a single site catalyst in the presence of propylene as sole monomer and in the presence of hydrogen or in the absence of hydrogen;
   (II) in a slurry polymerisation step, polymerising propylene only with the prepolymerised catalyst of step (I) in the presence of hydrogen; and subsequently
   (III) in a first gas polymerisation step polymerising propylene only in the presence of catalyst and polymer from step (II) and in the presence of hydrogen; and subsequently
   (IV) in a second gas polymerisation step, polymerising propylene and at least one C2-10 alpha olefin comonomer in the presence of the catalyst and polymer from step (III) and optionally in the presence of hydrogen;
   wherein the amount of hydrogen fed to the prepolymerisation step is at most 15% of the total amount of hydrogen fed to steps (I) and (II) of the polymerisation process.

2. A process as claimed in claim 1 wherein the amount of hydrogen fed to the prepolymerisation step is at most 10% of the total amount of hydrogen fed to steps (I) and (II) of the polymerisation process.

3. A process as claimed in claim 1 wherein no hydrogen is added in prepolymerisation step (I).

4. A process as claimed in claim 1 wherein the propylene polymer formed in the process is a heterophasic propylene copolymer.

5. A process as claimed in claim 1 wherein the weight split between slurry polymer and gas phase polymer is slurry/GP1(+GP2)) 25:75 to 60:40.

6. A process as claimed in claim 1 wherein said catalyst comprises a complex of formula (II)

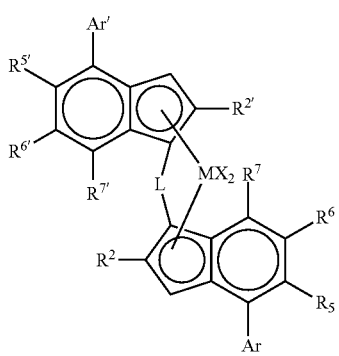

(II)

wherein
M is zirconium or hafnium;
each X is a sigma ligand;
L is a divalent bridge selected from —R'$_2$C—, —R'$_2$C—CR'$_2$—, —R'$_2$Si—, —R'$_2$Si—SiR'$_2$—, —R'$_2$Ge—,
wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;
$R^2$ and $R^{2'}$ are each independently a $C_1$-$C_{20}$ hydrocarbyl radical optionally containing one or more heteroatoms from groups 14-16;
$R^5$ and $R^{5'}$ are each independently hydrogen, $C_{1-20}$ hydrocarbyl group optionally containing one or more heteroatoms from groups 14-16 and optionally substituted by one or more halo atoms;
$R^6$ and $R^{6'}$ are each independently hydrogen or a $C_{1-20}$ hydrocarbyl group optionally containing one or more heteroatoms from groups 14-16; or
$R^5$ and $R^6$ taken together can form a 5 or 6 membered saturated or unsaturated carbon ring fused to the 6-membered ring of the indenyl group; or
$R^{5'}$ and $R^{6'}$ taken together can form a 5 or 6 membered saturated or unsaturated carbon ring fused to the 6-membered ring of the indenyl group;
$R^7$ and $R^{7'}$ are each independently hydrogen or $C_{1-20}$ hydrocarbyl group optionally containing one or more heteroatoms from groups 14-16;
Ar is an aryl or heteroaryl group having up to 20 carbon atoms optionally substituted by one or more groups $R^1$;
Ar' is an aryl or heteroaryl group having up to 20 carbon atoms optionally substituted by one or more groups $R^1$;
each $R^1$ is a $C_{1-20}$ hydrocarbyl group or two $R^1$ groups on adjacent carbon atoms taken together can form a fused 5 or 6 membered non aromatic ring with the Ar group, said ring being itself optionally substituted with one or more groups $R^4$; and
each $R^4$ is a $C_{1-20}$ hydrocarbyl group.

7. A process for the preparation of a propylene copolymer in a multistage polymerisation process in the presence of a single site catalyst as claimed in claim 1, said process comprising:
   (I) prepolymerising a single site catalyst in the presence of propylene as sole monomer and in the presence of hydrogen or in the absence of hydrogen;
   (II) in a slurry polymerisation stage, polymerising propylene only with the prepolymerised catalyst of step (I) in the presence of hydrogen; and subsequently
   (III) in a first gas polymerisation stage polymerising propylene only in the presence of the catalyst and polymer from step (II) and in the presence of hydrogen; and subsequently
   (IV) in a second gas polymerisation stage, polymerising propylene and at least one C2-10 alpha olefin comonomer in the presence of the catalyst and polymer from step (III);
   wherein the amount of hydrogen fed to the prepolymerisation step is at most 15% of the total amount of hydrogen fed to the steps I+II.

8. A process as claimed in claim 5 wherein the weight split between slurry polymer and gas phase polymer is slurry/GP1(+GP2)) 50:50 to 35:65.

9. A process as claimed in claim 1 wherein the catalyst is in solid particulate form free from an external carrier.

* * * * *